Jan. 12, 1965   R. T. OSEN   3,165,291
FLUID CONTROL DEVICES
Filed March 11, 1963   2 Sheets-Sheet 1

INVENTOR.
RALPH T. OSEN
BY
Alan M. Staubly
ATTORNEY

INVENTOR.
RALPH T. OSEN
BY
ATTORNEY

3,165,291
FLUID CONTROL DEVICES
Ralph T. Osen, Golden Valley, Minn., assignor to
Honeywell Inc., a corporation of Delaware
Filed Mar. 11, 1963, Ser. No. 266,130
11 Claims. (Cl. 251—134)

This invention relates to fluid control devices and more particularly to a motor driven operator for fluid flow control devices of the type having an angularly reciprocable fluid control member. Specifically this invention is concerned with a motor operated valve which is particularly adapted for use as a water valve in zoned temperature conditioning systems.

Recently, the trend has been increasingly toward the use of zone controlled heating and air conditioning systems for residential as well as commercial and industrial buildings. With this increase in the use of zone control systems, there has naturally followed the need for compact and relatively inexpensive fluid flow control devices for controlling the flow of water or air used in the heating or cooling of the buildings. In addition to the requirement that these valves or dampers and their operators be compact and relatively inexpensive, it is also necessary that they be dependable and, particularly in the case of water valves, that the valve gives a positive seal off when in the closed position.

The present invention provides an operator particularly adaptable for use with a zone control water valve wherein a small uni-directional electric motor drives a crank member which, in turn, operates a double toggle mechanism which is effective to reciprocate a valve closure member between open and closed positions. A rotary switch member, driven by the crank member, acts with a relay to control operation of the electric motor. By a novel arrangement of components and driving means between the crank member and the rotary switch, a conventional rotary switch is rotated through 180° while the crank member rotates through less than 180° between two positions corresponding to the closed positions of the valve closure member. Thus a conventional and commercially available rotary switch having diametrically opposed circuit breaking positions is rendered applicable so that a specially constructed and hence more expensive switch is not required. While the operator is particularly adapted for use with water valves, it may also be used for driving dampers such as those used in a forced air zone control system.

Therefore an object of my invention is to provide an improved operator for a fluid control device.

Another object of the invention is to provide an improved valve or damper operator which is extremely compact and relatively inexpensive and which is rugged and dependable.

A further object of the invention is to provide a fluid control valve and operator therefor which provides positive seal off of the valve closure member when it is in closed position.

Still another object of my invention is to provide an operator wherein a uni-directional electric motor drives a crank member which in turn operates a toggle mechanism which is then effective to angularly reciprocate a fluid flow control member and having means including a rotary switch for controlling the energization of the electric motor.

A still further object of the invention is to provide, in an operator as described above, a novel arrangement of components and driving connection between the crank member and the rotary switch so that the rotary switch is driven through 180° between two circuit breaking positions upon rotation of the crank member between two angular positions less than 180° apart and corresponding to the two closed positions of the valve closure member, thus rendering possible the use of the conventional rotary switch. These and other objects of the invention will become apparent upon reading the following detailed description of a preferred embodiment of the invention in conjunction with the accompanying drawing wherein:

FIGURE 5 also illustrates the relationship between an operating crank and rotary switch both of which form a part of my invention.

Figure 1:
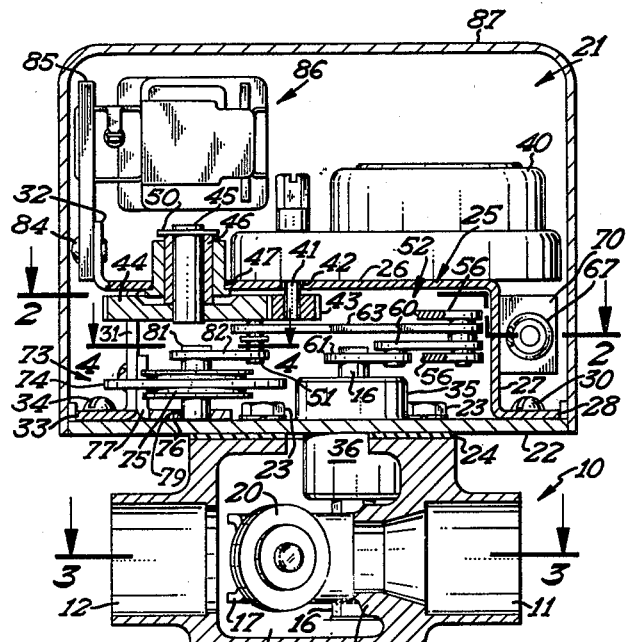
FIGURE 1 is a longitudinal cross-sectional view of a motor operated fluid control valve constructed according to my invention.

Referring to FIGURES 1 through 4, the reference numeral 10 generally designates a valve body having an inlet opening 11 and outlet 12 on opposite sides of a valve chamber 13. Openings 11 and 12 are adapted to be connected to appropriate tubing or piping (not shown). In the embodiment shown in FIGURES 1 and 3, these openings are adapted to be connected to tubing by sweat fitting but it will be obvious that they may also be threaded for connection to pipe. Intermediate inlet openings 11 and valve chamber 13 is formed a valve seat 14. At one side, valve body 10 has an enlarged portion 15 the interior of which forms an extension of chamber 13. In this extension is pivotally mounted a shaft 16 which has affixed thereto a valve carrying arm 17. Mounted on arm 17 is a valve closure member 20 which is adapted to cooperate with valve seat 14 to control the flow of fluid through the valve.

Figure 2:
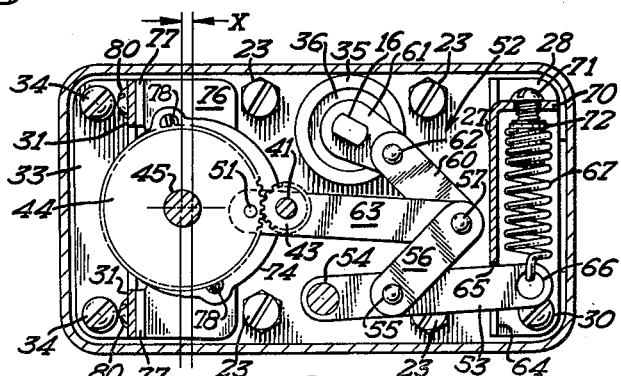
FIGURE 2 is a cross-sectional view of the valve operating mechanism taken generally along line 2—2 of FIGURE 1.
Figure 3:
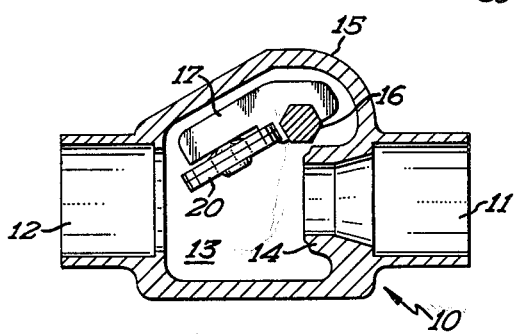
FIGURE 3 is a cross-sectional view of the valve body and valve closure member taken generally along line 3—3 of FIGURE 1.
Figure 4:
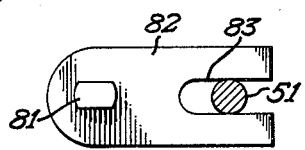
FIGURE 4 is a greatly enlarged fragmentary view taken generally along line 4—4 of FIGURE 1 and showing a crank operator for a rotary switch which forms a part of my invention.

Mounted on valve body 10 is an operator generally designated by numeral 21. Operator 21 includes a base plate 22 which is connected to valve body 10 by appropriate means, such as screws 23. Intermediate plate 22 and body 10 is placed a gasket 24 to provide sealing between the members. Carried by plate 22 is a mounting plate 25 which has a main portion 26 extending substantially parallel to plate 22. At the right end of member 25, as seen in FIGURES 1 and 2, is a downwardly extending leg portion 27, which terminates in a foot portion 28, which is attached to plate 22 by appropriate means such as screws 30. At the left hand end of member 25, as seen in FIGURES 1 and 2, are formed two downwardly extending legs 31 and intermediate these legs is an upwardly extending leg 32. Legs 31 are connected at their lower extremities by a foot portion 33 which is attached to plate 22 by appropriate means, such as screws 34. Plate 22 also has an upwardly struck portion 35 in which is mounted a bearing 36 for shaft 16. Bearing 36 extends through an opening in the top of valve body 10 and into the extended portion of chamber 13. This bearing member also includes packing means (not shown) to provide sealing between the chamber 13 of the valve body and the operator 21.

Mounted on the upper side of portion 26 of the member 25 is a uni-directional electric motor and gear train 40. Motor and gear train 40 has an output shaft 41 which extends through an aperture 42 in surface 26 and has mounted at its lower end a pinion 43. Driven by pinion 43 is a crank member 44 having gear teeth formed about its periphery. Crank member 44 is mounted on the a shaft 45 which is rotatably mounted in a bearing 46 which passes through an aperture 47 in surface 26 of member 25. Shaft 45 may be retained in the bearing by appropriate means, such as a snap ring 50 at its upper end. Crank member 44 has, extending downwardly from a point near its outer periphery, a crank pin 51.

Driven by crank pin 51 is a valve operating double toggle mechanism generally designated by numeral 52. The toggle mechanism includes a base link 53 pivotally mounted at one of its ends on plate 22 by a pin 54. Pivotally connected at one of their ends to base link 53, on either side threeof by a pin 55, is a pair of links 56. The links 56 merely extend parallel to each other and act as a single link except that they provide greater strength and stability. Therefore these two links will be referred to hereinafter as floating link 56. Connected to link 56 at the other end thereof by a pin 57 is a second floating link 60. Pins 57 hence provides a floating pivot between links 56 and 60. Floating link 60 is in turn pivotally connected to a crank 61 by a pin 62. Crank 61 is fixed to the upper end of shaft 16 which is pivotally mounted in the valve body as described hereinbefore. Also connected to pin 57 which connects floating links 56 and 60 is a driving link 63 which is pivotally connected at its other end top in 51 of crank member 44.

The outer end of base link 53 extends into a slot 64 formed in downwardly extending leg 27 of member 25. The end 65 of this slot forms an abutment for link 53 and thus determines the extent of counter-clockwise movement of link 53 as seen in FIGURE 2. At the outer end of link 53 is formed an aperture 66 which accepts the hooked end of a tension spring 67 which is adjustably connected at its opposite end to a tab portion 70 outwardly struck from leg 27 of member 25. As seen in FIGURE 2, spring 67 is connected to tab 70 by an adjustment screw 71 which is threaded into a mating member 72 which is, in turn, connected to the spring 67. Thus by rotating screw 71 the amount of tension in spring 67 may be adjusted. As seen in FIGURE 2, spring 67 tends to rotate base link 53 in a counter-clockwise direction and into engagement with abutment 65 on leg 27.

Mounted below crank member 44 is a wafer switch 73 which includes a fixed member 74 and rotatable portions 75. Fixed member 74 is mounted on a plate member 76 by appropriate means such as screws 78 and spaced upward from plate 76 by spacing pillars (not shown). Plate 76 has a pair of spaced upwardly extending legs 77 which are attached to leg portions 31 of the member 25 by appropriate means such as screws 80. Movable portions 75 are carried by a shaft 81 which may be journaled at its lower end in an aperture 79 in plate 76. Shaft 81 is driven by a crank arm 82 affixed to the upper end thereof. Crank 82 can be better seen by referring to FIGURE 4 wherein the crank is shown at a greatly increased size. For reasons which will be explained in connection with FIGURES 5 and 6, wafer switch 73 is not coaxial with shaft 45 and crank member 44. Rather the center of rotation of wafer switch 73 is offset a distance X from the center of rotation of shaft 45. Therefore a direct driving connection is not possible between shafts 45 and 81. The driving connection between the crank member 44 and shaft 81 of the wafer switch is accomplished by the crank arm 82 which has at its outer end an elongated slot 83 which accepts the lower end of crank pin 51. Thus while the water switch 73 is not co-axial with crank member 44 it is nevertheless directly driven thereby.

Mounted on upwardly extending leg 32 of member 25 by appropriate means such as rivets 84, is a member 85 on which is mounted a small relay 86 the purpose for which will be explained in connected with the following description of FIGURES 5 and 6. Enclosing the entire operator assembly 21 is a housing or cover 87 which may be attached to plate 22 or member 25 by appropriate means not shown.

In the foregoing description no mention has been made of the electrical connections or electrical connectors within the valve operator assembly. Also it will be noted that FIGURES 1 and 2 do not show any electrical wiring. It is to be understood that the wiring for this valve has been omitted in these figures for simplicity. This wiring is shown schematically in FIGURES 5 and 6.

Figure 5:
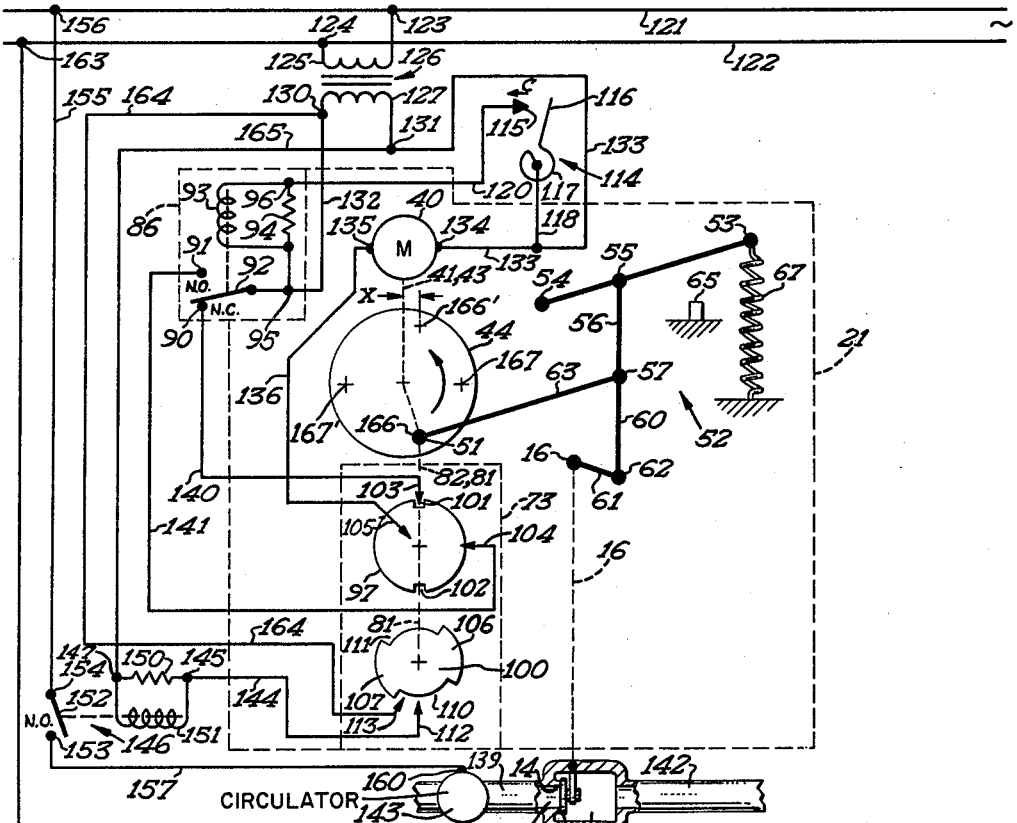
FIGURE 5 illustrates schematically a temperature control system wherein the valve is used to control the flow of water for heating or cooling, the system in this figure being in a satisfied condition with the valve closed.
Figure 6:
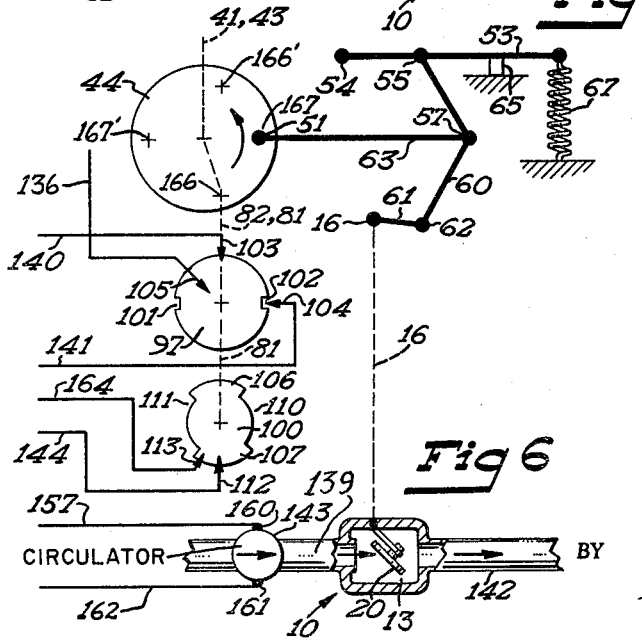
FIGURE 6 is a fragmentary schematic view, similar to FIGURE 5, but showing only the valve and valve operating mechanism with their parts in the valve "open" position.

Certain features of my invention and the operation thereof can best be seen by referring to FIGURES 5 and 6 wherein the valve and operator are shown schematically as employed in a zone control hot water heating system. It will be understood that FIGURES 5 and 6 show a single zone and in any building a number of these zones might be used.

Relay 86 as shown in FIGURE 5, is seen to be a conventional two position relay having a normally closed contact 90, a normally open contact 91 and a movable contact 92. Movable contact 92 is normally in engagement with normally closed contact 90 and is movable into engagement with normally open contact 91 upon energization of a relay coil 93 which is electrically connected in parallel with a current reducing resistor 94. Relay 86 has a first input terminal 95 to which is electrically connected both movable contact 92 and one side of resistor 94. A second input terminal 96 is electrically connected with the other side of resistor 94.

Wafer switch 73 is seen to include two conductive disk like members 97 and 100. These disks are represented in FIGURES 5 and 6 as two separate co-axial members mounted on a shaft 81 which is driven by crank member 44. The disks are thus represented for simplicity of description only. Actually they form a part of the movable portion 75 of the wafer switch as described in connection with FIGURES 1 and 2 and are mounted on opposite sides of an electrically insulative member which is mounted on shaft 81 and driven thereby. Shaft 81, as previously described, has slotted crank member 82 mounted on its upper end and is driven by pin 51 of crank member 44.

Disk 97 has diametrically opposed slots or portions of reduced diameter 101 and 102 formed therein. A pair of fixed electrical contacts 103 and 104 are arranged 90° apart and on on a circle having a radius such that these contacts engage conductive disk 97 at all times except when one of the slots 101 and 102 is moved adjacent to them. Another fixed contact 105 is positioned so that it is constantly in electrical contact with disk 97.

Disk 100 is a circular electrically conductive disk having diametrically opposed 90° arcuate sections removed therefrom. Thus the disk 100 has two 90° sectors 106 and 107 having a radius substantially equal to that of disk 97. Intermediate sectors 106 and 107 are diametrically opposed 90° spaces 110 and 111 about the periphery of the disk. Disk 100 is angularly positioned with respect to disk 97 so that one end of sector 106 of disk 100 is located about 30° in a clockwise direction from one side of slot 101 in disk 97. Co-acting with disk 100 is a pair of fixed electrical contacts 112 and 113 separated by an angular distance of about 15°. Contacts 112 and 113 are positioned in a circle having a radius such that they are effective to engage portions 106 and 107 when these portions are rotated adjacent to them but such that they do not make contact with the disk when spaces 110 and 111 are adjacent to them.

The system is controlled by a bimetal operated thermostat shown schematically in FIGURE 5 and generally designated by the numeral 114. Thermostat 114 includes, a fixed contact 115 and a movable contact 116 which is carried by a bimetal member 117. Fixed contact 115 is connected to input terminal 96 of relay 86 by a conductor 120. It is to be understood that any suitable thermostat may be used for this application.

Reference numerals 121 and 122 indicate a pair of conductors which may be connected across an electrical source such as a conventional 110 volt alternating current source. Connected to conductors 121 and 122 at terminals 123 and 124 respectively is a primary coil 125 of a voltage reducing transformer 126. Transformer 126 has a low voltage secondary coil 127 which has output terminals 130 and 131. Terminal 130 is connected to input terminal 95 of relay 86 by a conductor 132. Terminal 131 is connected to movable contact 116 of thermostat 114 by a pair of conductors 133 and 118. Conductor 133 also connects terminal 131 of transformer 126 to a terminal 134 on motor 40. Another terminal 135 on motor 40 is connected to fixed contact 105 of wafer switch 73 by a conductor 136. Fixed contact 103 of wafer switch 73 is connected to normally closed contact 90 of relay 86 by a conductor 140 and fixed contact 104 of wafer switch 73 is connected to normally open contact 91 of relay 86 by a conductor 141.

Connected to inlet opening 11 of the valve body 10 is a water pipe or tube 139 and connected to outlet opening 12 of the valve body is a similar water tube or pipe 142. Connected in the pipe 139 is an electrically operated circulator or pump 143 which may be of any conventional design. Connected to fixed contact 112 of wafer switch 73 by a conductor 144 is a first terminal 145 of an electromagnetic relay 146. Connected between terminal 145 and a second terminal 147 is the parallel combination of a resistor 150 and relay coil 151. Relay 146 includes a movable contact member 152 and a normally open fixed contact 153. Movable contact 152 is connected through a terminal 154, a conductor 155 and a terminal 156 to conductor 121. Fixed contact 153 is connected through a conductor 157 to a terminal 160 on circulator 143. A second terminal 161 on circulator 143 is connected by a conductor 162 to a contact 163 on conductor 122.

A conductor 164 connects fixed contact 113 of wafer switch 73 to terminal 130 of transformer 126. Terminal 147 of relay 146 is connected by a conductor 165 to terminal 131 of transformer 126.

The system is shown in FIGURE 5 in a satisfied position, that is, with thermostat 114 having its contacts 115 and 116 separated. Therefore the valve is in a closed position. Crank member 44 is in a position wherein pin 51 has moved driving link 63 so as to place toggle mechanism 52 in a toggle lock position. That is, connecting pivots 55, 57 and 62 are substantially aligned. It will be seen that in this position valve closure member 20 is held against seat 14 by the force of spring 67 which is now expanded since base link 53 is moved away from the abutment surface 65. It will be seen that there are two positions of crank 44 and hence crank pin 51 wherein the valve will be in a closed position. These positions are indicated at points 166 and 166′ in FIGURES 5 and 6. As shown in FIGURE 5, the pin 51 is in a position corresponding to point 166. These points are located in the two positions wherein a radius on crank member 44, drawn through pin 51, makes an angle of 90° with driving link 63. Therefore the positions 166 and 166′ are not diametrically opposed on crank member 44 but actually are located at an angle of slightly less than 180° apart. To insure good sealing of closure member 20 on seat 14, it is very important that motor 40 be stopped when pin 51 is as near as possible to point 166 or 166′. A relatively small variation from these points will result in a rather significant change in position of the floating pivot 57 of the toggle mechanism and hence a small variation in the stopping point of pin 51 may result in the mechanism being in some other position than the toggle-locked position shown in FIGURE 5.

Conventional and commercially available wafer switches normally provide for fixed contacts spaced at intervals of not less than about 15°. Therefore if motor 40 were to be controlled by a wafer switch driven by crank member 44 and co-axial therewith, in order to assure breaking of the circuit to the motor when the crank pin 51 was at one of the points 166 or 166′, a specially constructed wafer switch would be necessary.

As seen in FIGURES 5 and 6, this problem has been overcome by offsetting the wafer switch 73 so that the center of rotation thereof is moved a distance X from the center of rotation of the crank member 44. By doing so, the axis of rotation of the wafer switch is parallel to the axis of rotation of crank member 44 and intersects a line through the points 166 and 166′. Hence a conventional wafer switch is rendered applicable to the operator and the expense of a specially made switch is avoided.

This concept can be better understood by referring to the following description of the operation of the valve operator and with reference to the FIGURES 5 and 6. The system has been considered in a satisfied condition in connection with FIGURE 5. When the temperature in the enclosure wherein thermostat 114 is located drops to a point so that bimetal 117 moves movable contact 116 into electrical contact with fixed contact 115, a circuit is completed from transformer secondary coil 127, through contact 131, conductors 133 and 118, through the thermostat, conductor 120, relay coil 93 and conductor 132 to terminal 130 of transformer 127. Thus relay coil 93 is energized and movable contact 92 is moved into engagement with normally open fixed contact 91 thereof. This establishes an electrical circuit from secondary coil 127 of the transformer 126 through contact 130, conductor 132, movable contact 92, fixed contact 91, conductor 141, contact 104 of wafer switch 73, disk 97, fixed contact 105 and conductor 136 to terminal 135 of the motor. Since terminal 134 of the motor is constantly connected to terminal 131 of secondary coil 177 of the transformer by conductor 133, the motor 40 is now energized and drives crank member 44 in a counter-clockwise direction. As seen in FIGURES 5 and 6, the slots 101 and 102 in disk 97 are relatively narrow and hence after only a very small amount of rotation of the disk 97 contact 103 comes into electrical contact with the disk and a holding circuit is established so that should the thermostat become satisfied, the motor would not be stopped with the valve in a partially open position.

After wafer switch 73 has been driven a short distance in the counter-clockwise direction portion 107 of disk 100 will move into electrical contact with fixed contact 113 and after approximately 15° more rotation, portion 107 will also engage fixed contact 112. Thus after about 30° of rotation of the disk 100 a circuit is established from terminal 130 of transformer 126, through conductor 164, contact 113, disk 100, contact 112, conductor 144, relay coil 151 and conductor 165 to terminal 131 of the transformer. Thus relay 146 is energized and movable contact 152 thereof is moved to a closed position establishing electrical contact with fixed contact 153. This establishes a circuit from terminal 156 on conductor 121, through conductor 155, contacts 152 and 153 of relay 146, conductor 157 to terminal 160 of the circulator 143. Since terminal 161 of the circulator is continuously connected to conductor 122 through conductor 162 the circuit is now completed to the circulator and water is pumped through the system.

When motor 40 has driven crank member 44 through an angular distance slightly less than 90°, pin 51 is in a position designated by the numeral 167 and the toggle mechanism is moved to the position shown in FIGURE 6. This corresponds to an extreme toggle unlocked or valve open position. It will be seen that the toggle mechanism has a second extreme toggle unlocked position wherein the valve will be opened when pin 51 reaches a point 167' approximately 180° from point 167. Spring 67 has moved base link 53 into engagement with abutment 65 and further movement of pivot 57 has resulted in movement of the valve closure member 20 to a full open position. When this position is reached, disk 97 of wafer switch 73 has been rotated to a position so that slot 102 is adjacent fixed contact 104 and the circuit to motor 40 is broken. Thus the device will remain in this position as long as thermostat 114 remains closed.

When thermostat 114 becomes satisfied and movable contact 116 moves away from contact 115, coil 93 of relay 86 is deenergized. Hence movable contact 92 moves to its normally closed position in engagement with fixed contact 90. Thus a circuit is established from terminal 130 of transformer 126 through conductor 132, contacts 92 and 90 of relay 86, conductor 140, fixed contact 103, disk 97 and fixed contact 105 of wafer switch 73 and conductor 136 to terminal 135 on motor 40. Thus motor 40 is energized and crank member 44 is again driven in a counterclockwise direction. After a very slight angular movement of disk 97, fixed contact 104 of wafer switch 73 will also be in engagement with disk 97 and a holding circuit is again established so that the motor will continue to run should the thermostat again close. Disk 100 of wafer switch 73 will also be rotated in a counterclockwise direction and after rotation through approximately 15° portion 107 of the disk will break contact with fixed contact 112 and hence the circuit to relay 146 will be broken. Movable contact 152 will then move away from fixed contact 153 and the circuit to the circulator will be interrupted.

When crank 44 has moved so that pin 51 is in position 166', slot 102 of disk 97 of the wafer switch 73 will be moved adjacent fixed contact 103 and the circuit to motor 40 will again be interrupted. At this time the toggle linkage 52 will again be returned to a toggle locked position similar to that shown in FIGURE 5 and valve closure member 20 will again be held in engagement with seat 14 by the force of spring 67 acting on base link 53 of the toggle mechanism. It will be seen that although crank pin 51 has actually rotated an angular distance of less than 180°, in moving from point 166 to point 166', disk 97 of wafer switch 73 has actually been moved through 180°. This is due to the fact that the center of rotation of the wafer switch is offset from the center of rotation of the crank member 44 by the distance X corresponding to the slight variation of points 166 and 166' from diametrically opposed positions.

From the foregoing it can be seen that this invention provides a compact valve operator having a toggle mechanism which gives positive sealing of the valve closure member when in a closed position. It will also be seen that the structure of this valve operator is relatively simple and easily constructed. In addition, by offsetting the axis of rotation of the wafer switch from the axis of rotation of the toggle driving crank, and providing the slotted driving crank 82 for the wafer switch, a conventional wafer switch has been rendered applicable to the device.

While I have described and shown a preferred embodiment of my invention in connection with a water valve, it may obviously find application in many systems requiring an operator for valves, dampers or similar devices. Also it will be obvious that various modifications and changes to the structure shown and described herein may be apparent to those skilled in the art. Therefore I do not wish to limit the invention to the preferred embodiment shown herein, but intend that it should be limited only by the scope of the appended claims.

I claim:

1. A control device comprising: a housing; a control member mounted in said housing and reciprocable between first and second positions; uni-directional electric motor means mounted in said housing; a crank member rotatably mounted in said housing and driven by said motor means, said crank member including a crank pin; a driving link operably connecting said pin to said control member; and means including rotary switch means for controlling the energization of said motor means, said rotary switch means including fixed contact means and movable contact means rotatable with respect thereto, said movable contact means being operably connected to said crank member, said rotary switch means being positioned in said housing so that the axis of rotation thereof is spaced from and substantially parallel to the axis of rotation of said crank member and generally between the axis of rotation of said crank member and said control member, said switch means having diametrically opposed switching positions, said operable connection between said crank member and said movable contact means so arranged as to effect rotation of said movable contact means between said diametrically opposed positions upon rotation of said crank member between two angular positions other than 180° apart.

2. A control device comprising: a housing; a control member mounted in said housing and angularly reciprocable between first and second positions; uni-directional electric motor means mounted in said housing; a first crank member rotatably mounted in said housing and driven by said motor means, said first crank member including a crank pin; a second crank member operably connected to said control member and reciprocable therewith; a driving link operably connecting said pin to said second crank member; and means including rotary switch means for controlling the energization of said motor means, said rotary switch means including concentrically arranged fixed contact means and movable contact means rotatable with respect thereto, said movable contact means being operably connected to said crank pin, said rotary switch means being positioned in said housing so that the axis of rotation thereof is spaced from and substantially parallel to the axis of rotation of said first crank member and generally between the axis of rotation of said first and second crank members, said switch means having diametrically opposed switching positions corresponding to a control position of said control member which is maintained when said first crank member is in either of two angular positions less than 180° apart, said operable connection between said first crank member and said movable contact means being adapted to effect rotation of said movable contact means between said diametrically opposed positions upon rotation of said crank member between said two angular positions.

3. A control device comprising: a housing; unidirectional electric motor means mounted in said housing; a first crank member rotatably mounted in said housing and driven by said motor means, said crank member including a crank pin; an angularly reciprocable control member; a second crank member mounted in said housing and drivingly connected to said control member, said second crank member being angularly reciprocable between first and second positions; a double toggle linkage including a base link pivotally mounted in said housing, a first floating link pivotally connected to said base link, a second floating link connected to said first floating link by a floating pivot and pivotally connected to said second crank member; a driving link operably connecting the pin of said first crank member and said floating pivot; means yieldably urging said base link in a direction to cause said linkage to move said second crank member to its first position; abutment means limiting movement of said base link in said direction so that said second crank member is moved to its second position when said linkage is in an extreme toggle-unlocked position, said second crank member being maintained in its first position by the force of said yieldable means when said linkage is in a toggle-locked position; means including rotary switch means for controlling the energization of said motor, said rotary switch means including fixed contact means and movable contact means rotatable with respect thereto; and flexible drive means operably connecting said movable contact means to said first crank member, said rotary switch means being positioned in said housing so that the axis of rotation thereof is substantially parallel to the axis of rotation of said first crank member and offset therefrom so that it substantially intersects a line passing through the two positions of said crank pin which correspond to the toggle-locked positions of said linkage.

4. A control device comprising: a housing; a control member angularly reciprocable between first and second positions; a unidirectional electric motor and gear train mounted in said housing; a first crank member rotatably mounted in said housing and driven by said motor, said member including a crank pin; a second crank member operably connected to said control member and movable therewith; a double toggle linkage including a first link pivotally mounted on said housing, a second link connected to said first link by a floating pivot and pivotally connected to said second crank member, a driving link operably connecting said pin of said first crank member and said floating pivot between said first and second links, said control member being in said first position when said first crank member is rotated to either of two angular positions wherein said toggle linkage is in an extreme toggle-unlocked position, and said control member being in said second position when said first crank member is in either of two positions wherein said linkage is in a toggle-locked position; and means including rotary switch means for controlling the energization of said motor means, said rotary switch means including fixed contact means and movable contact means rotatable with respect thereto, said movable contact means being operably connected to said first crank member, said rotary switch means being positioned in said housing so that the axis of rotation thereof is substantially parallel to the axis of rotation of said first crank member and generally intersecting a line through the two positions of said crank pin which correspond to the toggle-locked positions of said linkage.

5. A control device comprising: a housing; control member angularly movable between first and second control positions; uni-directional electric motor means mounted in said housing; a first crank member rotatably mounted in said housing and driven by said motor means, said crank member including a crank pin; a second crank member mounted in said housing and angularly movable with said control member, a double toggle linkage including a base link pivotally mounted in said housing, a first floating link pivotally connected to said base link, a second floating link pivotally connected to said first floating link and to said second crank member; a driving link operably connecting the pin of said first crank member and the pivot point between said first and second floating links; means yieldably urging said base link in a direction to cause said linkage to move said control member to its first position; abutment means limiting movement of said base link in said direction so that said control member is moved to its second position when said linkage is in an extreme toggle-unlocked position, said control member being maintained in its first position by the force of said yieldable means when said linkage is in a toggle-locked position; means including rotary switch means for controlling the energization of said motor means, said rotary switch means including fixed contact means and movable contact means rotatable with respect thereto, and including diametrically opposed switching positions, said rotary switch means being positioned in said housing so that the axis of rotation thereof is substantially parallel to the axis of rotation of said first crank member and generally intersecting a line between said crank pin and said pivot point between said floating links when said toggle linkage is in an extreme toggle-unlocked position, said axis of rotation of said switch means being offset along said line a distance so that it substantially intersects a line through the two positions of said crank pin which corresponds to the toggle-locked positions of said linkage; and means operably connecting said movable contact means to said first crank member so that said movable contact means is rotated between said diametrically opposed positions when said crank pin is rotated between the two toggle-locked positions, said means including a third crank member operably connected to said movable contact means and having an elongated slot therein, said slot slidably accepting a portion of said crank pin of said first crank member so that said movable contact means is rotated by said pin.

6. A fluid control valve comprising: a valve body having an inlet and an outlet port, a valve seat intermediate said ports, a pivoted valve closure member movable between open and closed positions with respect to said valve seat; an operator housing mounted on said valve body; a uni-directional electric motor and gear train mounted in said housing; a first crank member rotatably mounted in said housing and driven by said motor; a second crank member in said housing and operably connected to said valve closure member; a toggle linkage including a base link pivotally mounted on said housing, a first floating link pivotally connected to said base link, a second floating link pivotally connected to said first floating link and pivotally connected to said second crank member, a driving link operably connecting said first crank member and the pivotal connection between said first and second floating links, spring means yieldably urging said base link in a direction to cause said linkage to close said valve closure member, abutment means limiting movement of said base link in said direction so that said closure member is moved to open position when said linkage is in an extreme toggle-unlocked position and is held in closed position by the force of said spring means when said linkage is in a toggle-locked position; and means including rotary switch means operable by said first crank member and having a center of rotation offset therefrom for controlling energization of said motor.

7. An operator for a fluid control device having a rotatable fluid control member comprising: a housing; unidirectional electric motor means mounted in said housing; a first crank member rotatably mounted in said housing and driven by said motor means, said crank member including a crank pin; a second crank member mounted in said housing and adapted to be drivingly connected to the fluid control member, said second crank member being angularly reciprocable between first and second positions; a double toggle linkage including a base link pivotally mounted in said housing, a first floating link pivotally connected to said base link, a second floating link connected to said first floating link by a floating pivot and pivotally connected to said second crank member; a driving link operably connecting the pin of said first crank member and said floating pivot; means yieldably urging said base link in a direction to cause said linkage to move said second crank member to its first position; abutment means limiting movement of said base link in said direction so that said second crank member is moved to its second position when said linkage is in an extreme toggle-unlocked position, said second crank member being maintained in its first position by the force of said yieldable means when said linkage is in a toggle-locked position; means including rotary switch means for controlling the energization of said motor, said rotary switch means including fixed contact means and movable contact means rotatable with respect thereto; and flexible drive means operably connecting said movable contact means to said first crank member, said rotary switch means being positioned in said housing so that the axis of rotation thereof is substantially parallel to the axis of rotation of said first crank member and generally intersecting a line defined by said crank pin and said floating pivot when said toggle linkage is in an extreme toggle-unlocked position, the axis of rotation of said switch means being offset along said line a distance so that it intersects a line passing through the two positions of said crank pin which correspond to the toggle-locked positions of said linkage.

8. An operator for a fluid flow control device having a fluid control member angularly reciprocable between first and second positions comprising: an operator housing; a unidirectional electric motor and gear train mounted in said housing; a first crank member rotatably mounted in said housing and driven by said motor, said member including a crank pin; a second crank member mounted in said housing and adapted to be operably connected to said valve closure member for movement therewith; a double toggle linkage including a first link pivotally mounted on said housing, a second link connected to said first link by a floating pivot and pivotally connected to said second crank member, a driving link operably connecting said pin of said first crank member and said floating pivot between said first and second links, said second crank member being in said first position when said first crank member is rotated to either of two angular positions wherein said toggle linkage is in an extreme toggle-unlocked position, and said second crank member being in said second position when said first crank member is in either of two positions wherein said linkage is in a toggle-locked position; and means including rotary switch means for controlling the energization of said motor means, said rotary switch means including symmetrically arranged fixed contact means and movable contact means rotatable with respect thereto, said movable contact means being operably connected to said first crank member, said rotary switch means being positioned in said housing so that the axis of rotation thereof is substantially parallel to the axis of rotation of said first crank member and generally intersecting a line between said crank pin and said floating pivot when said toggle linkage is in an extreme toggle-unlocked position, said axis of rotation of said switch means being offset along said line a distance so that it intersects a line through the two positions of said crank pin which correspond to the toggle-locked positions of said linkage.

9. An operator for a fluid flow control device having a fluid control member angularly reciprocable between first and second positions comprising: an operator housing; unidirectional electric motor means mounted in said housing; a first crank member rotatably mounted in said housing and driven by said motor means; a second crank member mounted for reciprocation between first and second angular positions in said housing and adapted to be operably connected to the fluid control member; a toggle linkage including a base link pivotally mounted on said housing, a first floating link pivotally connected to said base link, a second floating link pivotally connected to said first floating link and pivotally connected to said second crank member, a driving link operably connecting said first crank member and the pivotal connection between said first and second floating links; spring means yieldably urging said base link in a direction to cause said linkage to move said second crank member to one of its positions; and abutment means limiting movement of said base link in said direction so that said second crank member is moved to the other of its positions when said linkage is in an extreme toggle-unlocked position and is held in said one position by the force of said spring means when said linkage is in a toggle-locked position.

10. An operator for a fluid control device having a fluid control member angularly reciprocable between first and second positions comprising: a housing; uni-directional electric motor means mounted in said housing; a first crank member rotatably mounted in said housing and driven by said motor means, said crank member including a crank pin; a second crank member mounted in said housing and adapted to be operably connected to the fluid control member, said second crank member being rotatable between first and second angular positions corresponding to first and second positions of the fluid control member; a double toggle linkage including a base link pivotally mounted in said housing, a first floating link pivotally connected to said base link, a second floating link pivotally connected to said first floating link and to said second crank member; a driving link operably connecting the pin of said first crank member and the pivot point between said first and second floating links; means yieldably urging said base link in a direction to cause said linkage to move said second crank member to its first position; abutment means limiting movement of said base link in said direction so that said second crank member is moved to its second position when said linkage is in an extreme toggle-unlocked position, said second crank member being maintained in its first position by the force of said yieldable means when said linkage is in a toggle-locked position; means including rotary switch means for controlling the energization of said motor means, said rotary switch means including fixed contact means and movable contact means rotatable with respect thereto, said rotary switch means being positioned in said housing so that the axis of rotation thereof is substantially parallel to the axis of rotation of said first crank member and generally intersecting a line between said crank pin and said pivot point between said floating links when said toggle linkage is in an extreme toggle-unlocked position, said axis of rotation of said switch means being offset along said line a distance so that it intersects a line through the two positions of said crank pin which correspond to the toggle-locked positions of said linkage; and means operably connecting said movable contact means to said first crank member, said means including a third crank member drivingly connected to said movable contact means and having an elongated slot therein, said slot slidably accepting a portion of said crank pin of said first crank member so that said movable contact means is rotated by said pin.

11. A fluid control valve comprising: a valve body having an inlet and an outlet port, a valve seat intermediate said ports, a valve closure member angularly movable between open and closed positions with respect to said valve seat; an operator housing mounted on said valve body; uni-directional electric motor means mounted in said housing; a first crank member rotatably mounted in said housing and driven by said motor means, said crank member including a crank pin; a second crank member mounted in said housing and operably connected to said valve closure member, said second crank member being rotatable between first and second angular positions corresponding to closed and open positions of said valve closure member respectively; a double toggle linkage including a base link pivotally mounted in said housing, a first floating link pivotally connected to said base link, a second floating link pivotally connected to said first floating link and to said second crank member; a driving link operably connecting the pin of said first crank member and the pivot point between said first and second floating links; means yieldably urging said base link in a direction to cause said linkage to move said second crank member to its first position; abutment means limiting movement of said base link in said direction so that said second crank member is moved to its second position when said linkage is in an extreme toggle-unlocked position, said second crank member being maintained in its first postion by the force of said yieldable means when said linkage is in a toggle-locked position; means including rotary switch means for controlling the energization of said motor means, said rotary switch means including symmetrically located fixed contact means and movable contact means rotatable with respect thereto, said movable means having diametrically opposed switching positions, said switch means being positioned in said housing so that the axis of rotation thereof is substantially parallel to the axis of rotation of said first crank member and generally intersecting a line through the two positions of said crank pin which correspond to the toggle-locked positions of said linkage, and flexible drive means operably connecting said movable contact means to said first crank member so that said movable contact means is rotated between said diametrically opposed switching positions when said crank pin is rotated between the two toggle-locked positions, said drive means including a third crank member operably connected to said movable contact means and having an elongated slot therein, said slot slidably accepting a portion of said crank pin so that said movable contact means is rotated by said pin.

No references cited.